United States Patent [19]
Easterly et al.

[11] Patent Number: 5,840,260
[45] Date of Patent: Nov. 24, 1998

[54] CATALYST REMOVAL SYSTEM

[75] Inventors: Thomas Peyton Easterly, Friendswood; William Ogle Jones, Houston, both of Tex.

[73] Assignee: Shell Oil Company, Houston, Tex.

[21] Appl. No.: 741,502

[22] Filed: Oct. 31, 1996

[51] Int. Cl.⁶ ............................. B01J 8/08; B01J 20/34; A47L 9/02; B08B 5/04
[52] U.S. Cl. .......................... 422/219; 15/347; 15/421; 15/415.1; 137/545; 502/27; 502/34; 502/523; 134/21
[58] Field of Search ............................. 134/21; 502/27, 502/34, 523; 422/219; 137/545; 15/347, 421, 415.1

[56] References Cited

U.S. PATENT DOCUMENTS

| | | |
|---|---|---|
| 2,529,499 | 11/1950 | Jankelson . |
| 3,854,899 | 12/1974 | Germain et al. .......................... 51/319 |
| 4,863,884 | 9/1989 | Tasker et al. .............................. 502/27 |
| 5,114,685 | 5/1992 | Sapoff ...................................... 422/219 |

Primary Examiner—James C. Housel
Assistant Examiner—Phuong T. Bui
Attorney, Agent, or Firm—Fred Marlowe

[57] ABSTRACT

Dangers of catalyst removal are decreased while the efficiency of the process is increased by provision of a new nozzle. The nozzle is two concentric pipes connected at one end, with the inner pipe extending slightly beyond the outer pipe at the other end. The outer pipe has orifices provided at the connected end which communicate with the exterior of the outer pipe and the space between the inner and outer pipes. A vacuum is pulled on the inner pipe which, in turn, causes gas to enter the space between the inner and outer pipes via the orifices. As the gas sweeps around the end of the inner pipe, it entrains catalyst particles and carries the particles into the inner pipe. The inner pipe extends beyond the reaches of the outer pipe to a distance such that the angle formed between the ends of the inner and outer pipes is approximately equal to the angle of repose of the catalyst.

7 Claims, 1 Drawing Sheet

CATALYST REMOVAL SYSTEM

BACKGROUND OF THE INVENTION

1. Field of the Invention

This invention pertains to a process and apparatus for removing catalyst from a reactor vessel.

2. Prior Art

A vacuum hose with an attached pipe-like nozzle is used for removing catalyst from a vessel. A worker within the vessel must wear a protective suit and mask since the interior of the catalyst vessel is very dusty. A significant danger is in the use of the vacuum hose and nozzle. A high vacuum of 16 to 27 inches Hg is pulled in the hose, and the worker must be careful to keep his hands away from the nozzle. A number of injuries have been known to occur in the industry in this connection.

Accordingly, the present invention in response to the above-described need in the art, provides the solution set forth hereinafter.

SUMMARY OF THE INVENTION

It has now been discovered that dangers of catalyst removal can be significantly decreased while the efficiency of the process can be increased by provision of a new nozzle. The nozzle comprises two concentric pipes connected at one end, with the inner pipe extending slightly beyond the outer pipe at the other end. The outer pipe has orifices provided at the connected end which communicate with the exterior of the outer pipe and the space between the inner and outer pipes. A vacuum is pulled on the inner pipe which, in turn, causes gas to enter the space between the inner and outer pipes via the orifices. As the gas sweeps around the end of the inner pipe, it entrains catalyst particles and carries the particles into the inner pipe. The inner pipe extends beyond the reaches of the outer pipe to a distance such that the angle formed between the ends of the inner and outer pipes is approximately equal to the angle of repose of the catalyst.

DESCRIPTION OF PREFERRED EMBODIMENTS

This invention pertains to a change in the process for removing catalyst from a vessel by means of a nozzle which improves safety and efficiency of the process. A first efficiency is that the improved process does not pertain to vacuuming catalyst out of a vessel but to pneumatically conveying catalyst. Thus gas moves the catalyst, not vacuum, and it is more efficient. It does not matter how much vacuum is pulled, but what matters is how much gas is moved.

Figure 1:
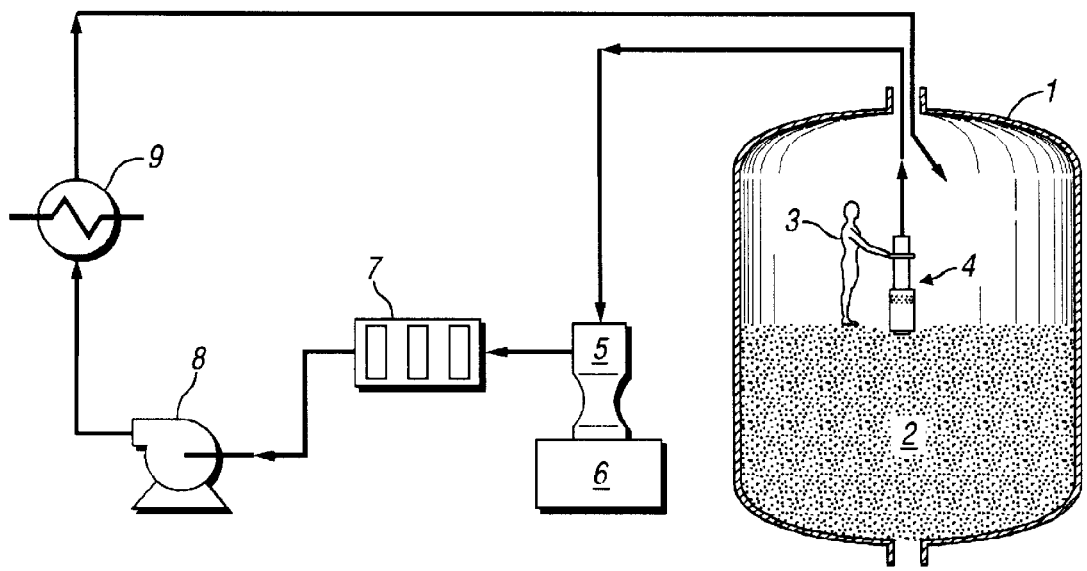
FIG. 1 is a perspective view of the entire apparatus involved in the process.

The improved efficiency increases the capacity of the entire process. FIG. 1 shows the apparatus of the entire process. A vessel 1 has catalyst particles 2 therein. A worker 3 mans a nozzle 4 which removes catalyst from the vessel 1. With the present invention and due to its high efficiency, the vacuum nozzle 4 can in many cases be handled by a worker from outside the vessel. The worker will still need some sort of respiratory protection but would not require the safety suit when outside the vessel, which would also reduce the risks associated with confined space entry. This means a substantial improvement in working conditions. The catalyst and gas are conveyed to a solids separator 5 (such as a cyclone) which separates the two with catalyst going to a receiving device 6 and gas and some entrained small solids to a secondary separator 7 (such as a baghouse). All solids are removed in the secondary separator. From the secondary separator 7 the gas goes to a blower 8 and then to either atmosphere or a heat exchanger 9 where the gas is cooled, for example by heat exchange with chilled water, and finally returned from the heat exchanger to vessel 1.

Figure 2:
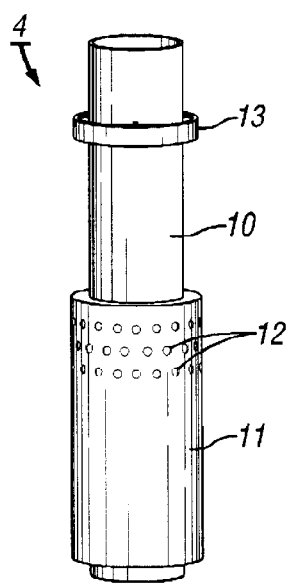
FIG. 2 is a perspective view of the nozzle of the invention.
Figure 3:
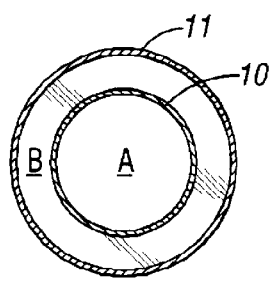
FIG. 3 is a cross-sectional view of the two concentric pipes of the nozzle.
Figure 4:
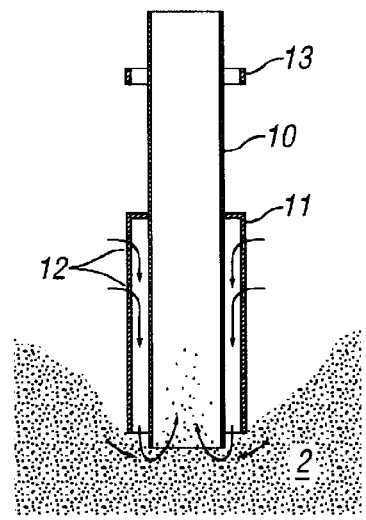
FIG. 4 is a cross-sectional view showing that the slope of an angle formed by a line connecting the ends of the two concentric pipes is related to the angle of repose of the catalyst particles.

FIGS. 2–4 provide various views of the nozzle 4 which comprises concentric pipes 10 and 11. Outside pipe 11 is closed at its upper end by attachment to inner pipe 10. Outside pipe 11 has orifices at its upper end which are evenly spaced around pipe 11 and result in a second efficiency of the process; that is, the even spacing of the orifices around the top of pipe 11 results in a better distribution of the particles in the nozzle. A third efficiency of the process is that the orifices are of sufficient size to result in approximately equal mixtures of gas and catalyst being taken into the nozzle 4 for a given level of vacuum. In any event it is desirable to have the right ratio of gas to catalyst; too little gas or too much gas reduces the efficiency of the process. To facilitate the correct amount of gas, as shown in FIG. 3, the cross-sectional area "A" of inner pipe 10 is approximately equal to the cross-sectional area of outside pipe 11 minus the cross-sectional area of inside pipe 10, e.g. area "B"; this in turn is approximately equal to the sum of the cross-sectional areas "C" of the orifices 12 in pipe 11. A fourth efficiency of the invention resides in extending the inner pipe 10 a relatively short distance beyond pipe 11. A line drawn tangential from the edge of pipe 10 to the edge of pipe 11 will have a certain slope which for best efficiency should be approximately equal to the angle of repose of the catalyst particles. This also facilitates the worker standing outside the catalyst vessel and manipulating the nozzle 4 to remove catalyst particles.

An additional safety feature of the invention resides in the use of a handle 13 which enables the worker to avoid getting hands and/or feet caught in the suction of nozzle 4 when the worker is inside the vessel manipulating the nozzle.

We claim:

1. An apparatus for removing catalyst particles from a bed of catalyst particles in a vessel comprising:

a means for creating a vacuum;

a nozzle connected to said means for creating a vacuum, said nozzle comprising an inside pipe connected at a first end thereof to which a pressure differential created by said vacuum means is applied, said inside pipe having an open second end opposite to said first end, a concentric outside pipe attached to the inside pipe at an end thereof opposite to the second end, the outside pipe being open at an end thereof proximate to the second end of the inside pipe, and circumferentially spaced orifices in the outside pipe, said orifices being sized in relation to the cross sections of the inside and outside pipes such that approximately equal mixtures of a gas and the catalyst particles are drawn into and through the nozzle for a given pressure differential created by the vacuum means; and a means for separating the catalyst particles from the gas connected to said nozzle.

2. The apparatus of claim 1 wherein the circumferentially spaced orifices are located proximate to where the pipes are attached together and spaced from the open ends of the pipes, thereby allowing the pipes to be submerged in the bed of catalyst particles.

3. The apparatus of claim 1 wherein the inside pipe extends beyond the open end of the outside pipe thereby creating an inwardly tapered slope of a tangential line connecting the open ends of the pipes.

4. The apparatus of claim 1 wherein the cross-sectional area of the inside pipe is approximately equal to the cross-sectional area of the outside pipe minus the cross-sectional area of the inside pipe, and in turn is equal to the total cross-sectional area of the orifices in the outside pipe.

5. The apparatus of claim 3 wherein the slope is approximately equal to an angle of repose of the catalyst particles.

6. A process for removing catalyst particles from a bed of catalyst particles in a vessel using the apparatus of claim 1, the process comprising:

placing the open ends of the pipes of the nozzle in the bed of catalyst particles;

creating a pressure differential with the vacuum means and applying said pressure differential to said inside pipe, whereby gas passes through the orifices into the outside pipe and then around the open second end of the inside pipe, and as the gas moves into the inside pipe, it entrains catalyst particles proximate to the open end of the inside pipe and then carries the entrained particles to the separating means, said pressure differential being such that approximately equal mixtures of gas and catalyst particles are taken into said nozzle; and separating the entrained particles from the gas.

7. The process of claim 6 wherein the separating means comprises a particle knockout vessel and a baghouse, the entrained catalyst particles being conveyed to the particle knockout vessel which separates the catalyst into a container and the gas and remaining entrained particles flowing to the baghouse for separation of the remaining particles from the gas.

\* \* \* \* \*